No. 868,766. PATENTED OCT. 22, 1907.
H. DÜNHÖLTER.
TRANSMISSION GEAR FOR FARE INDICATORS.
APPLICATION FILED APR. 26, 1907.

Witnesses
Emil Kayser
Carl Ruy

Inventor
Heinrich Dünhölter
by Robert Dripler
Attorney

UNITED STATES PATENT OFFICE.

HEINRICH DÜNHÖLTER, OF BERLIN, GERMANY.

TRANSMISSION-GEAR FOR FARE-INDICATORS.

No. 868,766.     Specification of Letters Patent.     Patented Oct. 22, 1907.

Application filed April 26, 1907. Serial No. 370,395.

*To all whom it may concern:*

Be it known that I, HEINRICH DÜNHÖLTER, a subject of the King of Prussia, German Emperor, and a resident of 5 Neue Jacobstrasse, Berlin, Germany, have invented a new and Improved Transmission-Gear for Fare-Indicators, of which the following is an exact specification.

This invention has reference to a new and improved transmission gear for driving intermittently or step by step an indicator or numeral wheels, disks or the like in counting mechanisms for fare indicators. It is known that the parts operating these wheels or disks are continuously rotated, and it is the object of the present invention to provide for means which permit the numeral wheels or disks to be intermittently turned in a simple manner without using any complicated additional means. Hitherto such means consist, for instance, of a special ratchet wheel which is fed by a ratchet pawl, controlled by a spring.

According to this invention the transmission gear is considerably simplified and this object is obtained by turning a shaft, which is intended to operate intermittently the numeral wheels or disks in such a manner that the shaft firstly is moved continuously during one part of a single revolution, and then is suddenly moved or turned during the following part of the same revolution, that is to say intermittently operated. During the continuous revolution the numeral wheels or disks are not operated by the shaft, but this portion of the movement of the shaft is used for stretching or tensioning a spring or the like convenient means, and during the subsequent part of a single revolution of the shaft the numeral wheels or disks are suddenly fed or jerked by the elastic impulse which is imparted to the shaft by the tensioned spring. In the course of this latter movement the shaft is accelerated or it advances with a greater velocity as the driving mechanism operating the said shaft is intermittently moved. The driving mechanism therefore has to be turned during a certain time before being permitted to turn further the said shaft. It will be observed that the intermittent movement of the shaft and the numeral wheels or disks can take place twice or several times during a single revolution.

In order to make my invention clear, reference is had to the accompanying drawing, in which my improved feeding mechanism is represented in conjunction with three numeral disks.

Figure 4:
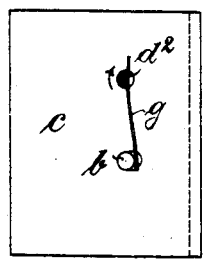
Figure 1:
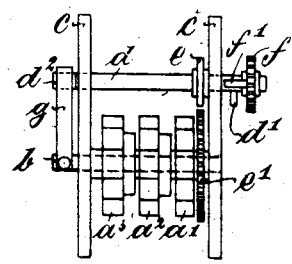
Figure 3:
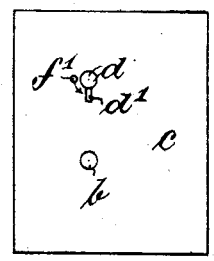
Figure 6:
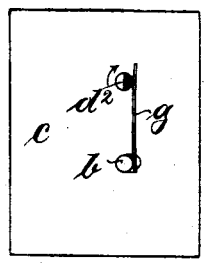
Figure 2:
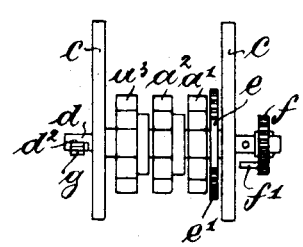
Figure 5:
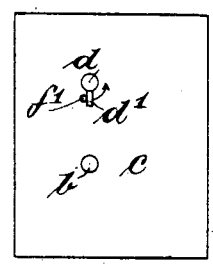
Figure 7:
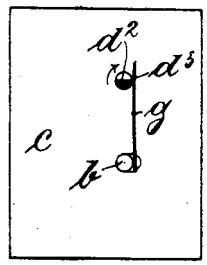

Figure 1 shows the device in a side elevation, Fig. 2 is a plan elevation, Fig. 3 a view seen from the right-hand side, Fig. 4 is a view seen from the left hand side, Figs. 5 to 7 show the feeding mechanism in different positions.

Referring to the figures, $a'$ $a^2$ $a^3$ are three indicating disks provided with numerals or figures as desired. The disks are mounted on the axle $b$ bearing in sideplates $c$. The disk $a'$ is externally operated and transmits its rotation to the other disks in any convenient and known manner. The disk $a'$ is put into rotation by means of a shaft $d$ upon which a wheel $e$ having one tooth is mounted. This wheel $e$ and its tooth respectively engages with a toothed rim $e'$ attached to the disk $a'$, thus causing the toothed rim $e'$ to be revolved further to be turned to the extent of one tooth for every revolution of the wheel $e$ and the shaft $d$.

On the right hand end of the shaft $d$ a toothed wheel $f$ is journaled, continuously rotated by any convenient driving means (not further shown). The wheel $f$ is provided with a lateral pin $f'$ which is adapted to interfere with a transverse pivot $d'$ fixedly mounted on the shaft $d$ which is then rotated by the wheel $f$. The left hand end of the shaft $d$ projecting over the sideplate $c$ is provided with a flattened part or recess $d^2$ (see Fig. 4). $g$ is a laminated spring fixedly attached to the shaft $b$ and bearing against the end of the shaft and the flattened part $d^2$ respectively. This mechanism operates as follows:—In the Figs. 3 and 4 the parts are shown in the position occupied after feeding has taken place (for the sake of clearness in the Fig. 3 the wheel $f$ loosely mounted on the shaft $d$ is omitted and the pivot $f'$ is illustrated only). The wheel $f$ turns continuously in the direction of the arrow, but the shaft $d$ will be at rest till the pivot $f'$ interferes with the transverse pivot $d'$ of the shaft $d$ (see Fig. 5). Now, the shaft $d$ is taken along and after a further revolution of 90° the shaft with its left hand side has occupied the position shown in Fig. 6. In this position the spring $g$ is tensioned. In further rotation through 90° the shaft $d$ is thus positioned (see Fig. 7) that by a further small rotation the edge $d^3$ of the shaft slides off from the spring $g$, thus causing the shaft to be intermittently or by leaps conveyed into the position according to the Figs. 3 and 4. The intermittent feeding is carried out by the wheel $e$, the one tooth of which is accordingly arranged.

In the shown mechanism all intermediate members not absolutely necessary are dispensed with and the transformation of the continuous revolution of the wheel $f$ into an intermittent movement takes place directly between the latter wheel and the numeral disks.

The foregoing described arrangement can be modified; for instance the wheel $e$ having one tooth can be loosely arranged upon the continuously rotated shaft $d$ and its hub can be provided with a flattened recess adapted to engage with an arrangement similar to that as provided at the end of the shaft $d$. Furthermore the gear can be used for intermittently feeding not only numeral wheels, disks, or the like, but also bodies moved in a straight line.

Having thus fully described the nature of my in- vention, what I desire to secure by Letters Patent of the United States is:—

1. A transmission-gear for fare-indicators, comprising: a driving-device such as (f) continuously operated in a single direction, a shaft operated by the driving device and capable of describing alternately a continuous and an intermittent movement, a spring coöperating with said shaft, which spring is tensioned by the shaft during its continuous movement and produces the intermittent motion of the shaft, indicator-wheels, disks or the like to be intermittently operated, and means for transmitting the intermittent movement of the said shaft to the numeral wheels or disks.

2. A transmission-gear for fare-indicators, comprising: a feeding mechanism comprising a driving device, such as (f) continuously operated in a single direction, a shaft operated by the driving device and having a flattened part or recess at its one end, numeral disks or wheels which are to be operated intermittently, a second shaft upon which the said numeral wheels are loosely mounted, a spring fixedly attached with its one end to the second shaft and bearing with its other end against the said recess of the shaft (d), and means for transmitting the intermittent motion of the latter shaft to the numeral wheels or disks.

3. A transmission-gear for fare-indicators, comprising: a feeding mechanism comprising: a driving device, such as (f) continuously operated in a single direction, a shaft (e) operated by the driving device and having a flattened part or recess at its one end, numeral disks or wheels which are to be operated intermittently, a second shaft upon which the said numeral wheels are loosely mounted, a spring fixedly attached with its one end to the second shaft and bearing with its other end against the said recess of the shaft (d), a toothed wheel (e) having one tooth and fixedly mounted on the shaft (d,) and a toothed rim (c') attached to one of the said numeral wheels for the purpose of being intermittently fed.

4. A transmission-gear for fare-indicators, comprising: a feeding mechanism comprising: a toothed wheel (f) provided with a lateral pin (f') and continuously operated in a single direction, a shaft (d) being provided with a cross pin adapted to interfere with the said lateral pin (f'), a shaft (d) having a flattened part or recess at its one end, numeral disks or wheels which are to be operated intermittently, a second shaft upon which the said numeral wheels are loosely mounted, a spring fixedly attached with its one end to the second shaft and bearing with its other end to the said recess of the shaft (d), a toothed wheel (e) having one tooth and fixedly mounted on the shaft (d), and a toothed rim (e') attached to the one end of the said numeral wheels.

In witness whereof I have hereunto set my hand in the presence of two witnesses.

HEINRICH DÜNHÖLTER.

Witnesses:
WOLDEMAR HAUPT,
HENRY HASPER.